Jan. 24, 1933.  G. H. TOWNSEND ET AL  1,895,385
MOTOR HEAT INDICATOR
Filed Feb. 18, 1929   3 Sheets-Sheet 2
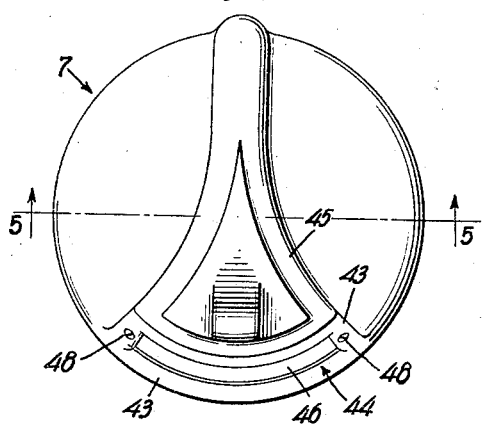
Fig. 2.
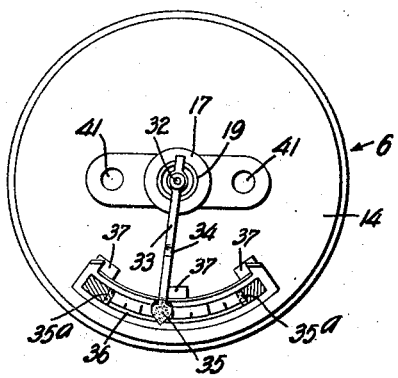
Fig. 3.
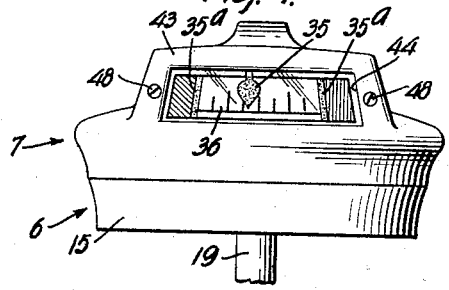
Fig. 4.
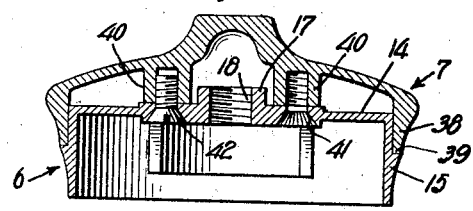
Fig. 5.
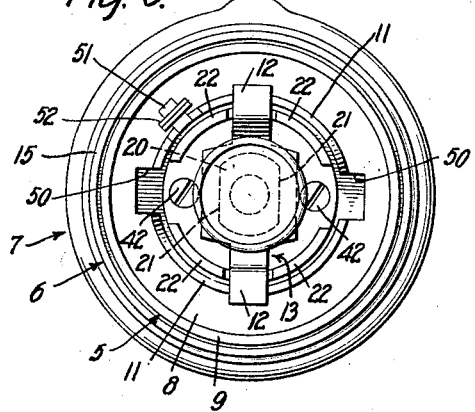
Fig. 6.
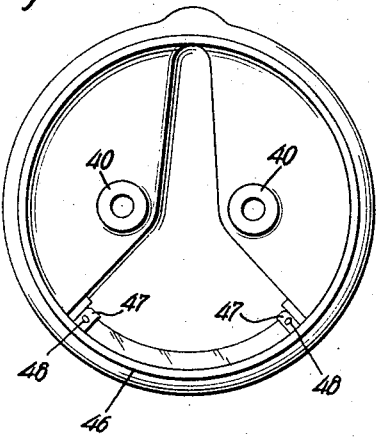
Fig. 7.
Fig. 8.
George H. Townsend and
Roy T. Hurley
INVENTORS
BY *Moses & Nolte*
ATTORNEYS Jan. 24, 1933.  G. H. TOWNSEND ET AL  1,895,385
MOTOR HEAT INDICATOR
Filed Feb. 18, 1929  3 Sheets-Sheet 3
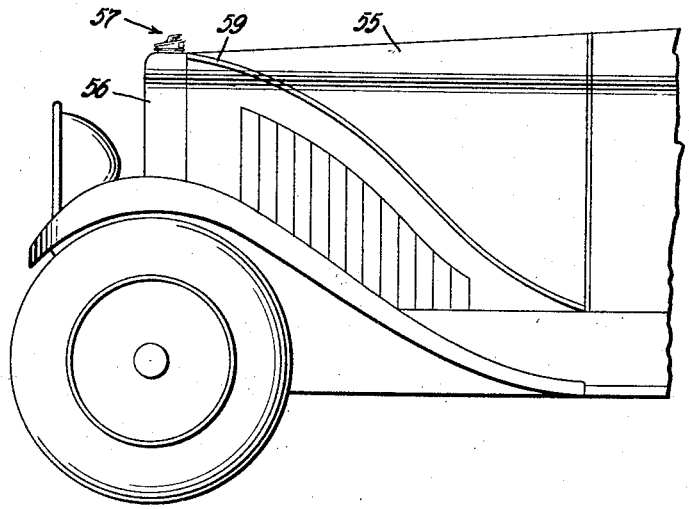
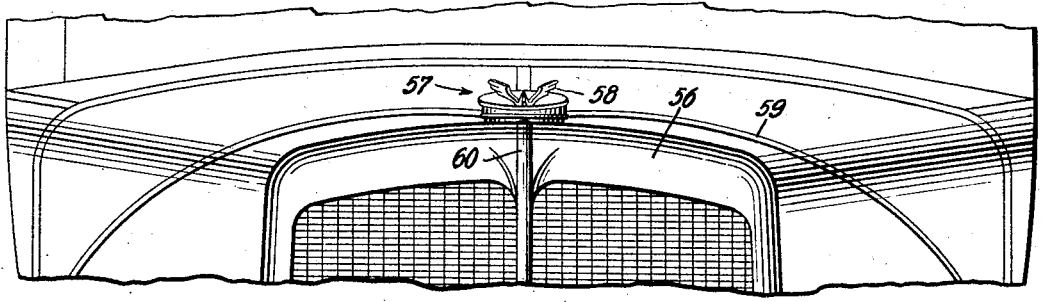
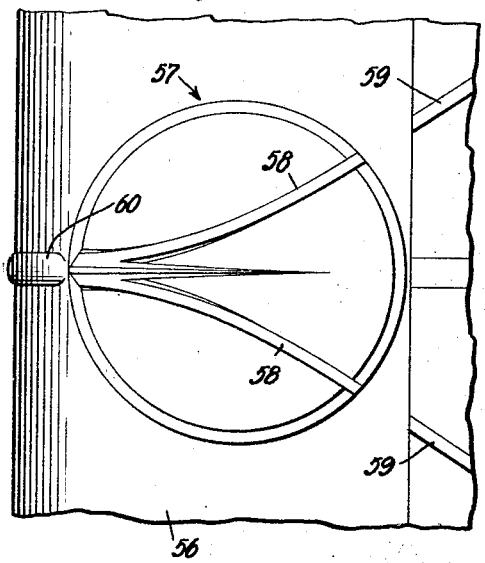
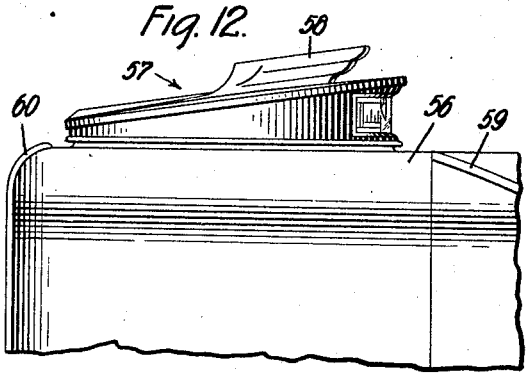
George H. Townsend and
Roy T. Hurley
INVENTORS
BY Moses & Nolte
ATTORNEYS Patented Jan. 24, 1933

1,895,385

UNITED STATES PATENT OFFICE

GEORGE H. TOWNSEND, OF GREENWICH, CONNECTICUT, AND ROY T. HURLEY, OF DOBBS FERRY, NEW YORK, ASSIGNORS, BY MESNE ASSIGNMENTS, TO MOTO METER GAUGE & EQUIPMENT CORPORATION, OF LONG ISLAND CITY, NEW YORK, A CORPORATION OF DELAWARE

MOTOR HEAT INDICATOR

Application filed February 18, 1929. Serial No. 340,861.

This invention relates to combined radiator caps and motor heat indicating means and has for an important object the provision of a structure which will be so compact and so advantageously arranged that the motor car manufacturer will be free to utilize the cap for procuring substantially any type or style of ornamentation or producing any kind of distinctive appearance desired, whether his taste runs to the display of elaborate figures and insignia or to the plain flat appearance which is at present in vogue.

It is a further object of the invention to provide, in combination, an inner shell member and indicator mechanism carried wholly by the inner shell member and arranged to operate in a space of restricted height immediately above the inner shell member, the arrangement being such that the unit formed by the inner shell member and the indicator mechanism is adapted for interchangeable association with a wide variety of types and styles of outer shell members, including outer shell members of minimum height, with the inner and outer shell members completely enclosing the indicator mechanism and peripherally exposing said mechanism to view.

It is a further object of the invention to provide a cap which completely houses and displays an indicator mechanism, which forms a sealing closure for the mouth of the radiator neck, which houses and conceals the radiator neck, and which merges and blends harmoniously with the lines of the radiator.

Other objects and advantages will hereinafter appear.

In the accompanying drawings forming part of this specification which illustrate one preferred embodiment of the invention:

Figure 2 is a plan view of the cap illustrated in Figure 1, but on a smaller scale;

Figure 3 is a plan view of the same cap with the upper or outer shell removed;

Figure 4 is a front elevation of the combined cap and instrument as it would be seen by the driver of the vehicle when applied to the radiator neck;

Figure 5 is a transverse, vertical section on the line 5—5 of Figure 2, looking in the direction of the arrows, the indicating mechanism being omitted;

Figure 6 is a bottom plan view of the combined cap and instrument;

Figure 7 is a bottom plan view of the upper or outer shell of the cap;

Figure 8 is a detail elevation showing the sight glass;

Figure 9 is a fragmentary, side elevation of an automobile radiator and hood, showing a cap of modified external appearance mounted on the radiator;

Figure 10 is a fragmentary elevation on a larger scale than Figure 9, looking from the front of the vehicle;

Figure 11 is a fragmentary plan view on a larger scale than Figure 10; and

Figure 12 is a fragmentary side elevation on the same scale as Figure 11.

Figure 1:
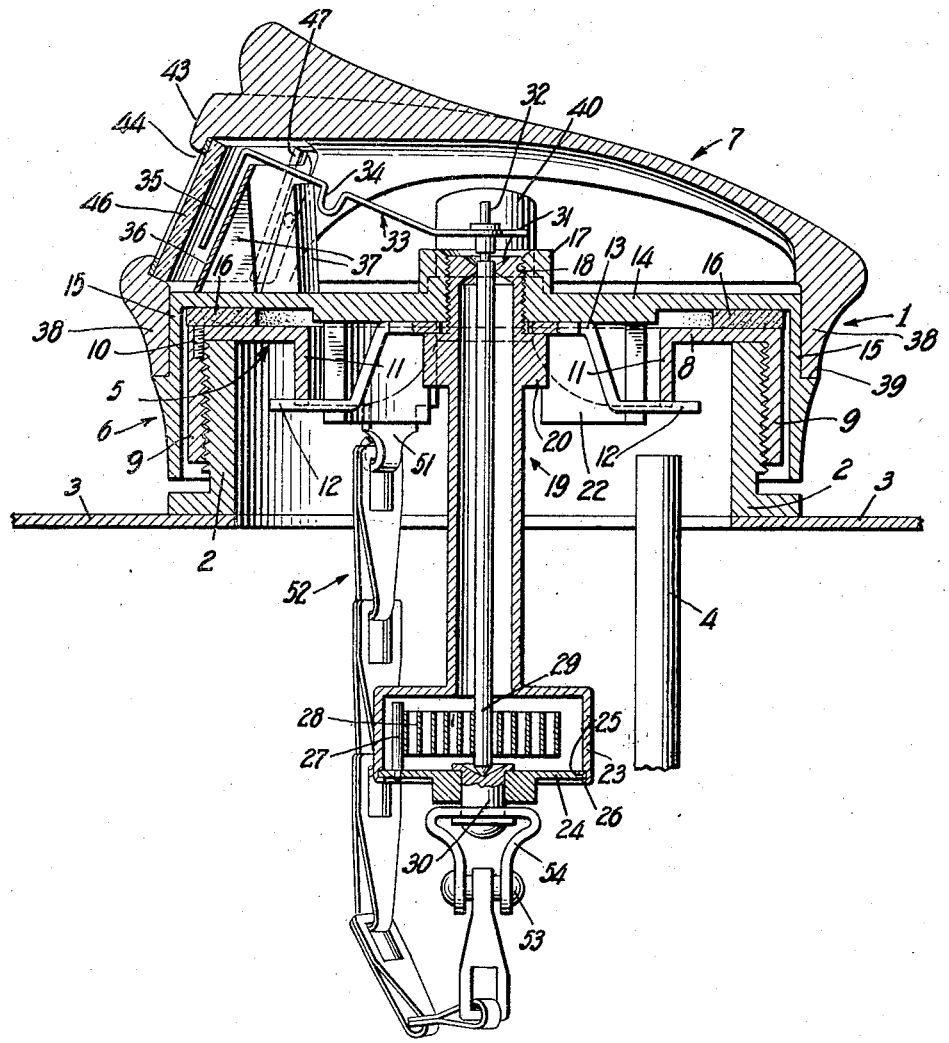
Figure 1 is a longitudinal, vertical section through the upper portion of a radiator and through a radiator cap on the neck thereof, which cap embodies features of the invention.

In Figure 1 the combined cap and instrument 1 is shown as applied to the neck 2 of the radiator 3 of a vehicle motor. As is well known, the cooling liquid of a vehicle motor is circulated by a pump or by thermo-siphon action, being delivered from the water jackets (not shown) to the upper part of the radiator, and being returned from the lower part of the radiator after it has been cooled therein to the lower part of the water jackets. When it is desired to replenish the liquid in the cooling system, the cap 1 is removed from the neck and liquid is poured in. The level to which the liquid may normally rise in the radiator is limited by the provision of an overflow pipe 4 which terminates in an open mouth in the upper portion of the radiator or in the neck. Under ordinary running conditions the water is at a somewhat lower level than the mouth of the overflow pipe, since some of the water passes out of the pipe when the water surges and some of the water is lost by evaporation.

The particular cap and instrument assembly herein chosen to illustrate the invention comprises three principal units, an insert or adapter unit 5 which may be permanently secured to the radiator neck, an inner shell unit 6 which carries the indicator and the operating mechanism therefor, and an outer shell unit 7 provided with a window and a scale and acting jointly with the inner shell to form a housing for the indicator mechanism. The adapter unit 5 and the inner shell unit 6 are also desirably provided with cooperating members for quickly and conveniently securing the cap proper (that is, the assembly formed by the inner and outer shell units), in place upon the radiator neck, and also with means capable of permanently securing the cap against separation from the radiator neck, but of permitting limited movement of the cap away from the neck for filling purposes.

The use of the adapter and the means associated therewith for securing the cap in place upon the radiator neck and for preventing complete separation of the cap from the neck, while useful and important, is not essential, as the combined cap and indicator may be mounted in any desired or usual way upon the neck.

The insert is designed to adapt a cap of given size to a variety of sizes and styles of radiator necks. It comprises an annular body portion 8 having an annular flange 9 extending completely around the circumference thereof. Such flange 9, as shown herein, is provided with internal threads for cooperation with the external threads of the radiator neck 2. The insert unit 8 is threaded onto the neck 2 as far as it will go, and is locked against unthreading by the driving of a pin or screw 10 through the body portion 8 in position to bite into, and deform, the threads of the radiator neck. A suitable recess is provided in the adapter for reception of such pin or screw, and this recess, in case a screw is employed, is desirably threaded.

The adapter is provided with downwardly extending flanges 11 along the inner edges thereof, which flanges are formed as cams for engagement with cooperating locking arms 12 of a locking member 13 carried by and forming part of the inner shell assembly 6.

The flanges 11 are provided with detent notches into which the arms 12 of the locking member 13 fit for arresting rotation of the cap with the cap in a definite angular relation to the adapter. By positioning the adapter carefully in a predetermined rotative position and then fixing it against rotation by the screw 10 the adapter becomes in effect a part of the neck and the necessity for carefully orienting the cap when it is removed from and replaced upon the radiator neck is permanently avoided.

The inner and outer shell units 6 and 7 form the cap proper and carry all of the indicating mechanism and the operating mechanism therefor. The inner shell member comprises a substantially circular body portion 14 and an annular, downwardly extending, continuous flange 15. The flange 15 is adapted to embrace the adapter flange 9 and the body portion 14 is adapted to rest upon a gasket ring 16, which in turn rests upon the body portion 8 of the adapter. The body portion 14 of the inner shell is provided at the center thereof with an upstanding boss 17, and a threaded bore 18 extends through this boss and through the body portion 14. A hollow stem 19 is threaded into the bore 18, and extends downward from the body portion 14. The stem 19 has, adjacent the upper end thereof, a collar 20 having flat faces 21 whereby it may be gripped for screwing the stem securely into place. The locking member 13, which may be in the form of a yoke, and which terminates in the offset arms 12, is impaled upon the upper end of the stem 19 and bears against the upper face of the collar 20 so that it is securely gripped between the collar 20 and the lower face of the body portion 14 of the inner shell. The inner shell is provided with downwardly extending abutments 22 which are shown herein as segmental flanges. The arms 12 extend between adjacent pairs of these abutments and are prevented from rotating relative to the inner shell by the abutments.

The stem 19 is enlarged at its lower end to provide a drum-shaped casing member 23. The lower end of this casing member is closed by a metal disc 24 which is secured in place by positioning it first against a downwardly facing shoulder 25 at the lower end of the casing member 23, and then spinning the end portion of the casing member 23 inward to form a flange 26 in engagement with the outer surface of the disc 24.

Before the disc 24 is put in place, however, in the manner just described, an upstanding pin 27 is secured to it and the outer end of a spiral bi-metallic spring 28 is soldered to the pin. This bi-metallic spring 28 is soldered at its inner end to a shaft 29 which has bearing, at the lower end thereof, in a bearing rivet 30 that is centrally mounted in the disc 24. The disc 24 is secured to the casing member 23 with these parts secured to it in the manner described.

In effecting this assembly the shaft 29 is inserted through the stem 19 and is received, adjacent the upper end thereof, in a bearing 31. The shaft is reduced at its upper end and the reduced end portion 32 projects upward beyond the upper end of the stem 19. This reduced portion may be tapered and has secured thereon a pointer 33. The pointer extends upwardly and forwardly and is desirably provided with a loop 34 for a purpose to be described. The outer end 35 of the pointer is turned downward and is adapted to move across the face of an arcuate scale plate 36 in proximity thereto. Such movement of the pointer is imparted by the bi-metallic spring which rotates the shaft 29 in one direction as the temperature rises, and in the opposite direction as the temperature falls. The body portion 14 of the inner shell is provided at the forward marginal portion thereof with upstanding posts or projections 37, there being three of these posts in the illustrative instrument. The forward faces of the posts are inclined and therefore support the scale plate 36 in an inclined position. The scale plate is suitably secured to the forward faces of the posts 37, as by means of solder or cement. It will be observed that the pointer extends across the upper edge of the scale plate and that the downturned end 35 of the pointer lies in front of the scale plate and extends approximately parallel to it. The downturned end 35 of the pointer and the index marks 35A indicating the upper and lower limits of the safe operating range are desirably painted with a paint containing a radium compound to facilitate reading of the instrument at night.

The outer shell unit comprises a circular casing or shell member which terminates marginally in a downwardly extending flange 38. This flange 38 snugly fits the upper periphery of the flange 15 of the inner shell and rests upon an upwardly facing shoulder 39 formed externally upon such flange 15. The outer shell is inclined from rear to front.

At opposite sides of its center the outer shell is provided with downwardly extending bosses 40 provided with threaded recesses. The inner shell is provided with openings 41 in alignment with these recesses and is secured to the outer shell by screws 42 passed through the openings 41 and threaded into the recesses of the bosses 40. The passages 41 are frusto-conical at their lower ends, and are roughened or serrated to grip the screw heads and thus obviate the need for lock washers.

The outer shell is provided at the forward end thereof with an upstanding wall 43 in which there is a window opening 44. This wall forms the forward boundary of a hollow boss 45 in which the pointer 33 moves, and in which the scale plate 36 is housed. The wall 43 is internally recessed for the reception of window pane 46 which is formed as a segment of a frustum of a cone. Small retaining plates 47 overlie the inner faces of the ends of the window and are clamped thereagainst by screws 48 threaded through the wall 43 and into the plates 47 from the exterior of the wall 43. The window pane 46 is provided with notches 49 through which the screws 48 pass. The frusto-conical pane 46 bears at its upper and lower edges against surfaces of the wall 43. Since a frusto-conical surface when flattened out forms an annulus, or a segment of an annulus, having arcuate edges it is evident that engagement of the wall 43 with the edges of the pane 46 contribute substantially to the avoidance of transverse distortion of the pane, and therefore the avoidance of vibration of the pane, and makes the provision of clamping means along the longitudinal margins of the pane unnecessary.

The upper edge of the scale plate and the top of the outer shell form a narrow slot through which the pointer 33 extends and in which it operates. The loop 34 of the pointer enables the pointer, itself, to be accurately and quickly adjusted and therefore obviates the necessity for precision in the construction of the various parts.

Assuming that the adapter unit 5 has been permanently applied to the neck 2, the cap and instrument assembly may be put in place and secured against vibration and against accidental detachment by thrusting the assembly down upon the adapter so that the inner shell member 6 embraces the adapter, as shown in Figure 1. In moving to this position the arms 12 travel through notches 50 formed in the adapter. The cap assembly is then rotated in a clockwise direction, and this causes the arms 12 to engage the cam surfaces of the cam members 11 and to draw the cap assembly down firmly into place. When it is desired to remove the cap assembly the reverse operation is performed, that is, the cap is rotated counterclockwise until the arms 12 have become aligned with the slots 50, whereupon the cap assembly is withdrawn. The tail ends of the cam members 11 are provided with abrupt surfaces, and hence, in this reverse rotation, the cap is positively arrested with the arms 12 in alignment with the slots 50.

Provision is further made for preventing complete detachment of the cap assembly from the radiator while permitting limited separation for filling purposes. As has been pointed out, the adapter unit is permanently attached to the radiator neck in a theft-proof manner. One of the cam members 11 of the adapter is provided with a downwardly extending ear 51 which is looped through, and clinched down upon, the end link of a chain 52. The link at the opposite end of this chain embraces a rivet 53 which is permanently secured to the arms of a yoke 54. The yoke 54 is provided in the intermediate or body portion thereof with an aperture, and is impaled upon the bearing rivet 30, which in turn is secured permanently to the disc 24. It will be seen that the connection formed between the adapter and the cap assembly permanently shackles the cap assembly to the radiator while permitting limited separation of the cap assembly therefrom.

Figures 9 to 12 show a hood 55 and radiator 56 of an automobile with a cap 57 mounted on the radiator. The cap 57 may be the same in internal construction as the cap of Figures 1 to 8, with the single exception that the flanges of the inner and outer shells are substantially shorter than the flanges 15 and 38 of the cap of Figures 1 to 8. The indicating mechanism is the same in construction and is mounted and operated in the same manner.

These figures are designed particularly to illustrate how the cap with the indicator mechanism housed therein may be designed to completely enclose the radiator neck and to blend harmoniously with the lines of the vehicle itself. The cap extends down into or almost into contact with the radiator shell and completely conceals the radiator neck. The cap inclines upward at a gradual slope, so that the fact that the cap is raised at the rear to enclose indicator mechanism is scarcely perceptible, from the front of the vehicle. From the driver's seat, however, the indicator mechanism is plainly visible.

The cap is provided with ornamental wings 58 designed to harmonize with the appearance of the particular vehicle, and if desired, to constitute the emblem of the manufacturer. In the illustrative embodiment it will be noted that the wings 58 are aligned with curved beads 59 in the hood, and that they come together in alignment with the bead 60 of the radiator. It will be appreciated, of course, that other ornamental devices might be used in place of the wings, and that the ornamentation may be applied to other portions of the exterior surface of the cap if desired.

While we have illustrated and described in detail certain preferred forms of our invention, it is to be understood that changes may be made therein and the invention embodied in other structures. We do not, therefore, desire to limit ourselves to the specific constructions illustrated but intend to cover our invention broadly in whatever form its principle may be utilized.

We claim:

1. In a combined radiator cap and motor heat indicating instrument, in combination, an inner shell, a downwardly extending stem mounted centrally upon said shell, a temperature responsive element in the lower end of said stem, a vertical shaft having bearing engagement with the stem at the upper and lower ends thereof, and connected for rotation by the temperature responsive element, a forwardly inclined pointer carried by the shaft, an upstanding scale plate carried by the shell, said pointer extending across an edge of the scale plate and having its outer end bent sharply across the face thereof to travel across the face of the scale plate in proximity thereto, an outer shell cooperating with the inner shell to form a housing for the pointer and the scale plate, and a window carried by the outer shell in alignment with the scale plate.

2. In a motor heat indicator, in combination, a temperature responsive element, an upwardly extending shaft driven thereby, a pointer carried by the shaft, a scale plate extending transversely of the plane of rotation of the pointer, said pointer extending from the rear to the front of the scale plate, and having the outer end thereof bent to extend across the face of the scale plate, the pointer also having a loop formed intermediate its ends to facilitate transverse and longitudinal adjustment of the pointer relative to the scale plate.

3. In a combined radiator cap and motor heat indicator, in combination, a substantially level inner shell member, a forwardly extending pointer centrally pivoted with respect to said shell member, means for rotating said pointer through a range covering a forward, central sector of the cap, an outer shell member having its maximum height in the central, forward sector thereof to form with the inner shell, a chamber to accommodate the pointer throughout its operative range, and sloping downward to substantial engagement with the upper surface of the shell at the edges of the other sectors thereof, means located outside said forward, central sector for securing said shells to one another in predetermined, angular relation, an upstanding window in the forward, central sector of the outer shell, and an upstanding scale plate mounted in alignment with the window for cooperating with said pointer.

4. In a combined radiator cap and motor heat indicator, in combination, an outer shell member having an ornament supporting outer surface which is of little height in its central rear sector and is inclined to a greater height in its central forward sector, an inner shell member cooperative with the outer shell member to form a chamber in the central forward sector, an upstanding scale plate substantially filling the height of the chamber at the front of the cap but having its upper edge spaced from the outer shell, a temperature responsive element carried by the inner shell member, a substantially vertical shaft driven thereby and terminating at the upper end thereof behind the central plate, and a pointer supported by the shaft below the upper edge of the central plate said pointer being turned upward and extended between the outer shell and the upper edge of the scale plate and having its outer end turned downward across the face of the scale plate.

5. In a combined radiator cap and motor heat indicator, in combination, an inner shell completely covering and closing the radiator neck and having a neck-embracing annular flange and a marginal external rabbet, an outer shell member having an annular flange embracing a portion of the inner shell and fitting said rabbet, the outer walls of said flanges substantially merging, a window carried by the outer shell in a central forward sector thereof, and indicating mechanism carried by the inner shell and visible through said window.

6. In a combined radiator cap and motor heat indicator, in combination, an inner shell completely covering and closing the radiator neck and having a neck-embracing annular flange and a marginal external rabbet, an outer shell member having an annular flange embracing a portion of the inner shell and fitting said rabbet, the outer walls of said flanges substantially merging, and temperature indicating means housed by said shell members.

7. In a combined radiator cap and motor heat indicator, in combination, a pair of shell members defining a chamber, indicating mechanism in such chamber, one of said shell members having a window opening therein, a curved window pane bearing marginally against a wall of said member, said pane having notches formed in opposite end margins thereof, and means penetrating the wall and the notches and clamping the pane to the wall.

8. In a combined radiator cap and motor heat indicator, in combination, a pair of shell members defining a chamber, indicating mechanism in said chamber, one of said shell members having a window opening therein, a curved window pane bearing marginally against the surfaces of said member, said pane having the upper and lower edges thereof formed upon arcs of different radius, and means securing the pane to the shell member at the end margins of the pane only.

9. In a combined radiator cap and motor heat indicator, in combination, a pair of shell members defining a chamber, indicating mechanism therein, a stem depending from one of said shell members and having an internal annular shoulder at the lower end thereof, a disc fitting against said shoulder and retained thereagainst by a flange spun inward from the stem wall, a bimetallic spiral coil connected at its outer end to the disc, and a shaft secured to the inner end of said coil, said shaft being connected to operate the indicating mechanism.

10. In combination, a combined radiator cap and motor heat indicator, an inseverable flexible connector permanently secured at one of its ends thereto, an adapter having threaded engagement with the radiator neck and permanently secured to the opposite end of the connector, and means permanently preventing unscrewing of the adapter from the radiator neck.

11. In combination, a combined radiator cap and motor heat indicator, an inseverable flexible connector permanently secured at one of its ends thereto, a member fitting the radiator neck and permanently secured to the opposite end of the flexible connector, and means permanently preventing the separation of said member from said radiator neck.

12. In combination, a combined radiator cap and motor heat indicator, an inseverable flexible connector, permanently secured at one of its ends thereto, a member fitting the radiator neck and permanently secured to the opposite end of the flexible connector, means permanently preventing the separation of said member from said neck, and coacting elements carried by said member and said cap for securing the cap removably in position to close the neck.

13. In a motor vehicle having a radiator neck, in combination, a combined cap and motor heat indicator for the neck, comprising a shell member and a stem depending therefrom, an adapter fitting the neck and secured thereto, downwardly facing cam members carried by the adapter, said stem being threaded to the shell member and having a collar facing the shell member, and a yoke clamped between the collar and the shell member, and provided with out-turned arms for engagement beneath said cam members to secure the cap in place on the neck.

14. In a motor vehicle having a radiator neck, in combination, downwardly facing cam members carried by the neck within the opening thereof, a combined cap and motor heat indicator for the neck, comprising a shell member and a stem depending therefrom, said stem being threaded to the shell member and having a collar facing the shell member, and a yoke clamped between the collar and the shell member and provided with out-turned arms for engagement beneath said cam members to secure the cap in place on the neck.

15. The combination with a cap-like member, for mounting on an automobile radiator, having a finished metallic upper exterior surface adapted to be ornamented or to bear ornamentation devices as customarily employed on automobiles but with a window in the wall thereof, of indicating mechanism, automatically responsive to changing operating conditions, said mechanism having peripherally observable indicator means arranged below said finished upper surface to obviate projections or obstructions above said surface, said indicator means comprising a fixed scale plate inclined to the vertical and a pointer cooperative therewith.

16. In a combined radiator cap and motor heat indicating instrument, in combination, an inner shell member adapted to lie close to the upper end of the radiator neck, and to form a closure therefor, an outer shell member cooperating therewith to form a substantially flat chamber, said outer shell member having a circular flange extending below the upper end of said neck, indicating mechanism in said chamber carried solely by the inner shell member, and operating mechanism for the indicating mechanism, carried also by the inner shell member.

17. In a combined radiator cap and motor heat indicating instrument, in combination, an inner shell member comprising a thin body portion adapted to lie close to the upper end of the radiator neck, and a circumferential flange adapted to embrace the radiator neck, an outer shell member embracing the inner shell member and extending at a forward inclination above it to form a horizontally disposed chamber therewith, in a forward, central sector, temperature responsive mechanism carried by the inner shell member in position to lie within the radiator, and indicating mechanism in said chamber connected for operation within the bounds of such forward, central sector by the temperature responsive mechanism.

18. In a combined radiator cap and motor heat indicator, in combination, an outer shell member having a window opening and a segmental window pane mounted in said opening, said outer shell member having a depending annular flange and a depending boss inside said flange, an inner member inside said flange and below said window, and means for securing said inner member to said boss.

19. In a motor vehicle having a radiator neck, a hollow adapter associated with said neck, a combined radiator cap and motor heat indicating instrument cooperating with said adapter to form a closure for said neck comprising a cap having an annular flange depending outside of said adapter, a window thereabove, an indicator visible through said window, a temperature responsive element depending inside of said adapter, operating mechanism whereby said indicator is operated by said temperature responsive element, and an inner shell unit which carries the indicator and the operating mechanism therefor.

20. In a motor vehicle having a radiator neck, a hollow adapter associated with said neck, a combined radiator cap and motor heat indicating instrument cooperating with said adapter to form a closure for said neck, said cap having an annular flange depending outside of said adapter, a substantially level inner member mounted inside said flange above said adapter, a drum shaped casing member carried by said inner member and depending inside of said adapter, a temperature responsive element in said drum shaped casing member, indicating means in said cap above said inner member and means whereby said indicating means is actuated by said temperature responsive element.

21. In a motor vehicle having a radiator neck, in combination, an adapter associated with said neck, a combined radiator cap and motor heat indicating instrument cooperating with said adapter to form a closure for said neck comprising a cap formed with an outer shell member having an annular flange depending outside of said adapter and a hollow boss of maximum height in the central forward sector of said cap and sloping rearwardly therefrom to said flange, an inner member secured inside of said flange, a pointer pivotally mounted with respect to said inner member and extending toward said portion of maximum height, and a window in said boss at the portion of maximum height through which said pointer is visible, temperature responsive means carried by said inner member and depending into said adapter, and means whereby said temperature responsive means moves said pointer through a range within said boss and across the inner side of said window.

In testimony whereof we have affixed our signatures to this specification.

GEORGE H. TOWNSEND.
ROY T. HURLEY.